United States Patent [19]

Kelly et al.

[11] Patent Number: 5,058,903
[45] Date of Patent: Oct. 22, 1991

[54] DRILL ROD SEAL

[75] Inventors: Michael J. Kelly, North Bay; Kevin J. Hummel, Powassan, both of Canada

[73] Assignee: Redpath Raiseboring Limited, Ontario, Canada

[21] Appl. No.: 367,056

[22] Filed: Jun. 16, 1989

[51] Int. Cl.$^5$ .............................. F16J 15/46
[52] U.S. Cl. ................... 277/34; 277/138; 166/88
[58] Field of Search ............... 277/34, 34.3, 165, 157, 277/138; 166/88; 175/423

[56] References Cited

U.S. PATENT DOCUMENTS

| | | | |
|---|---|---|---|
| 2,351,343 | 6/1944 | Kelley | 277/34 |
| 2,506,359 | 5/1950 | Haslam | 277/34.4 |
| 2,648,554 | 8/1953 | Gilbert, Sr. | 277/34.3 |
| 2,778,431 | 1/1957 | Lynes . | |
| 3,065,628 | 4/1963 | Malone . | |
| 3,085,627 | 4/1963 | Sodich . | |
| 3,104,717 | 9/1963 | Sandlin et al. . | |
| 3,209,830 | 10/1965 | Orr et al. | 166/88 |
| 3,337,222 | 8/1967 | Smith et al. | 277/34.3 |
| 3,434,536 | 3/1969 | Tubbs | 166/88 |
| 3,456,725 | 7/1969 | Hatch . | |
| 3,486,772 | 12/1969 | Elsner | 277/34 |
| 3,492,007 | 1/1970 | Jones | 277/34 |
| 3,722,895 | 3/1973 | Mevissen | 277/34.3 |
| 3,889,749 | 6/1975 | Hutchison . | |
| 4,268,331 | 5/1981 | Stevens | 277/34.3 |
| 4,532,987 | 8/1985 | Reed | 166/88 |
| 4,646,827 | 3/1987 | Cobb | 166/88 |

FOREIGN PATENT DOCUMENTS

| | | |
|---|---|---|
| 609132 | 11/1950 | Canada . |
| 552173 | 1/1958 | Canada . |
| 636185 | 2/1962 | Canada . |
| 651641 | 11/1962 | Canada . |
| 663778 | 5/1963 | Canada . |
| 841462 | 5/1970 | Canada . |
| 904748 | 7/1972 | Canada . |

Primary Examiner—William A. Cuchlinski, Jr.
Assistant Examiner—Daniel C. DePumpo
Attorney, Agent, or Firm—Nixon & Vanderhye

[57] ABSTRACT

For use with a raise drill or other earth or rock drills. A seal assembly comprises a housing for the sealing engagement with the walls at the top of the shaft, a flexible, generally cylindrical seal for engagement with a drill rod and an inflatable bladder disposed between the housing and the seal and serving to press the seal into sealing engagement with the drill rod.

3 Claims, 6 Drawing Sheets

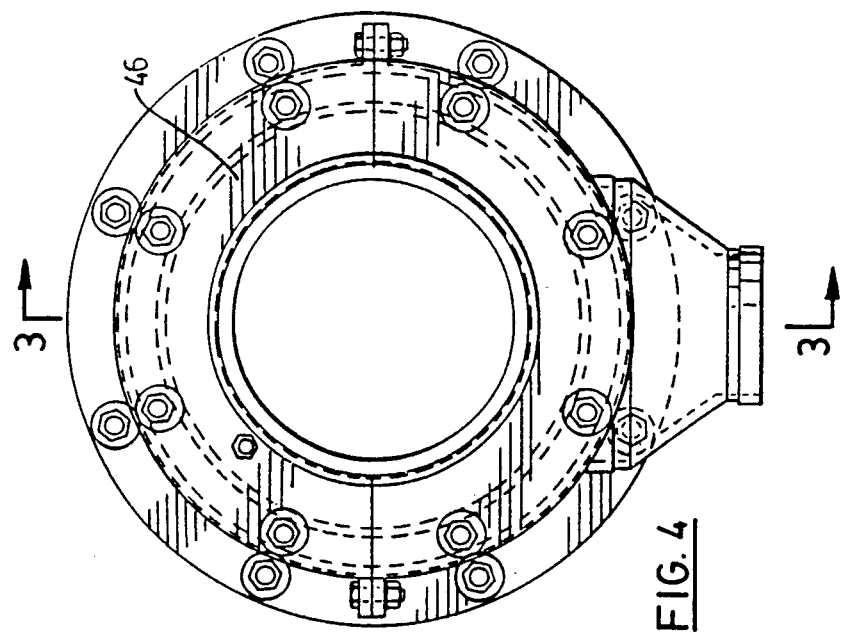
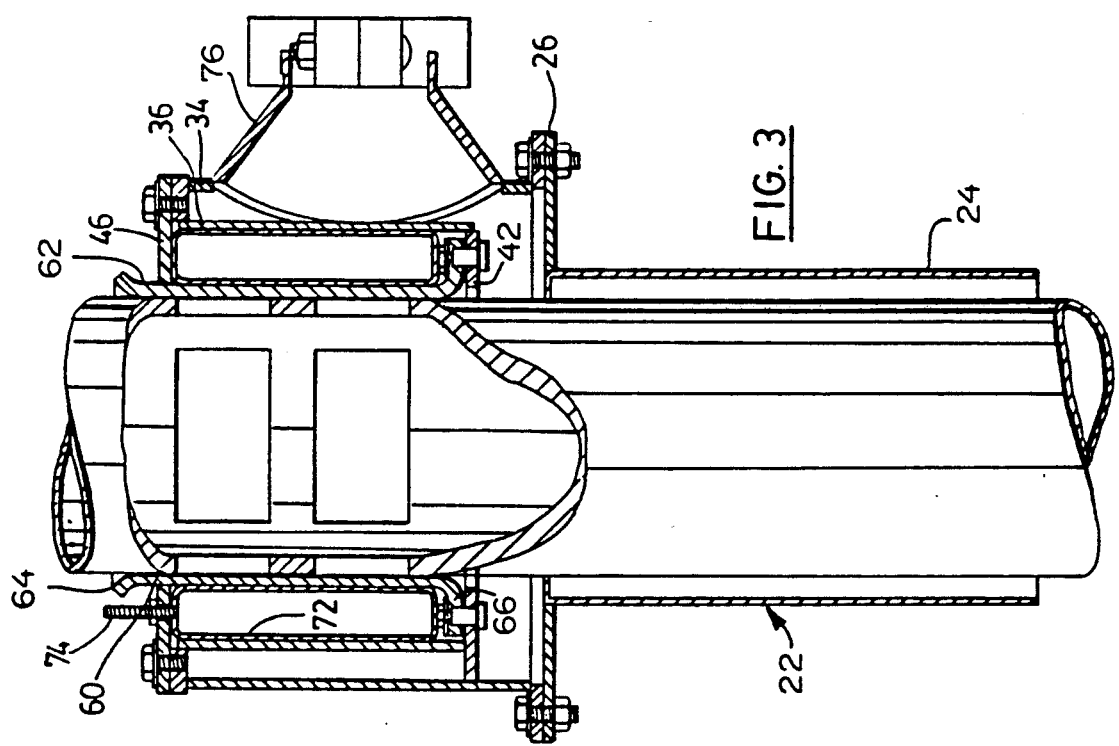

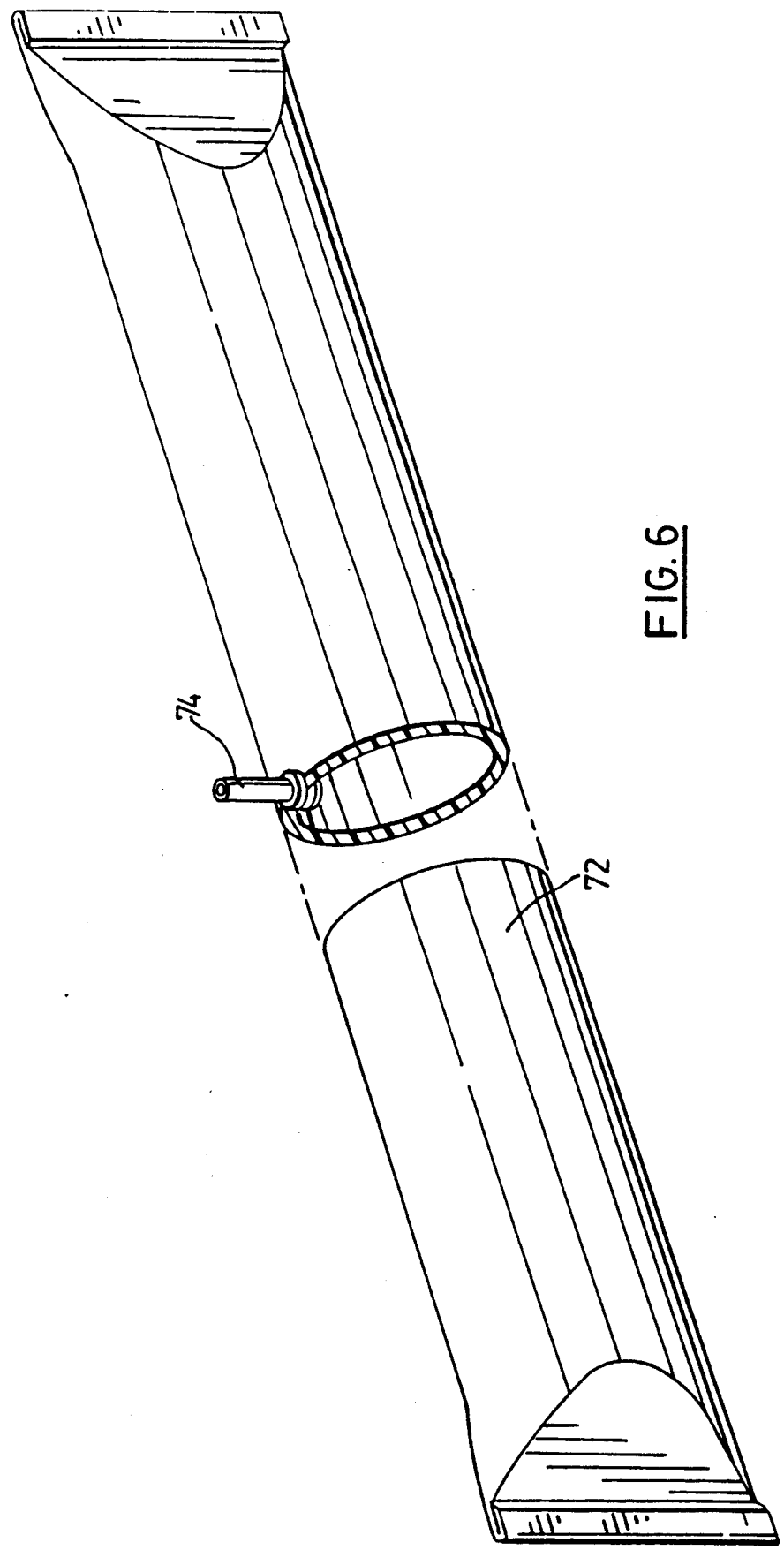

DRILL ROD SEAL

This invention relates to a raise drill or other earth or rock drills, and particularly to a seal arrangement for such a drill. Hereinafter, the invention will be described with reference to its application to raise drills although it will be apparent that it is also applicable to other earth and rock drills.

In mining and in other processes involving rock drilling, it is conventional to drill a pilot shaft from one level (which may be the surface) to another using a raise drill and air and water or other coolant/cleaner is delivered at high pressure to the drill bit through a hollow drill rod. That air and water mixes with drill bit fines to form a slurry which is forced up the outside of the drill rod to the surface or other level from which drilling is begun.

The present invention seeks to provide a seal for disposition about the upper end of the drill rod to prevent the uncontrolled egress of the slurry.

According to this invention, there is provided a seal for a raise drill comprising a housing for sealing against the walls of the upper end of the shaft, a flexible, generally cylindrical seal for engagement with a drill rod and an inflatable bladder disposed between the housing and the seal and serving to press the seal into sealing engagement with the drill rod.

Preferably, the housing presents an inner cylindrical wall and the bladder is disposed in the toroidal space between that wall and the cylindrical seal.

An outlet is preferably formed in the housing leading to the space below the seal and is connectable to a conduit to lead off the slurry.

A preferred embodiment of the invention is illustrated in the accompanying drawings in which:

FIG. 3 is a cross section taken on the line 3—3 of FIG. 4 of the seal assembly according to the present invention;

FIG. 4 is a plan view of the seal assembly of FIG. 3;

FIG. 6 is a perspective view of the bladder of the seal assembly according to this invention.

Figure 1:
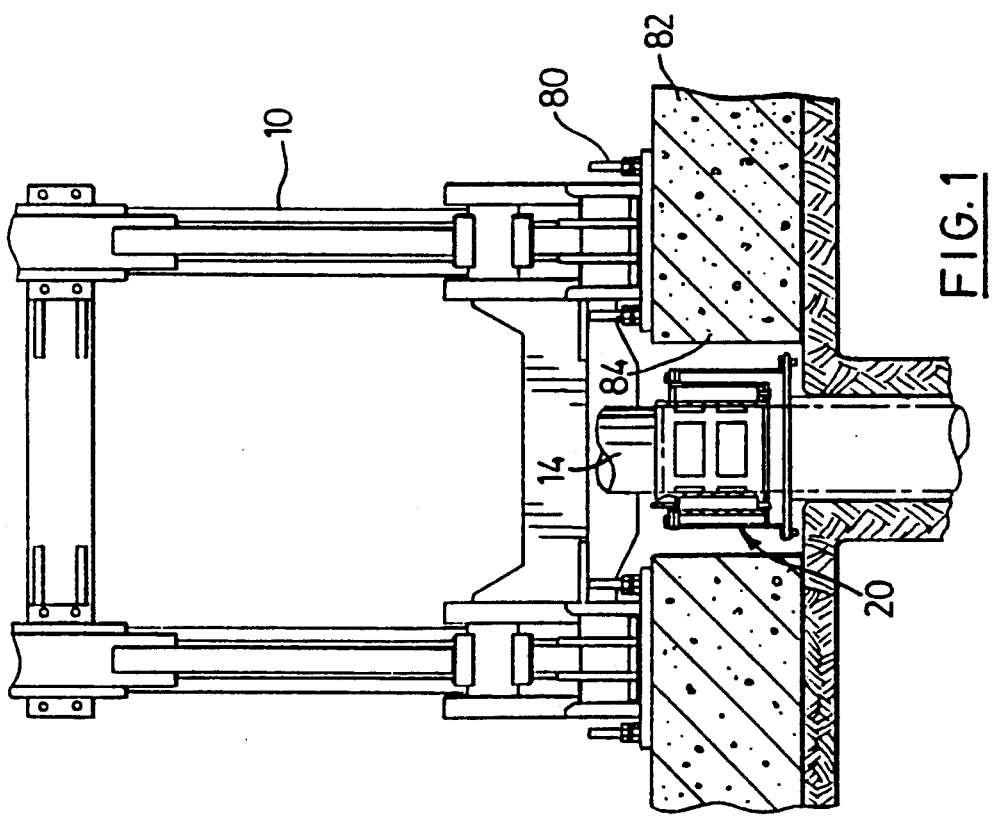
FIG. 1 is a front elevational view of a raise drill and seal assembly with significant parts omitted in the interest of clarity.

The raise drill assembly illustrated schematically and partially in FIG. 1 is of entirely conventional form and in particular is of the kind known by the trade mark REDBORE 40 manufactured by Redpath Manufacturing Ltd. It comprises a main body assembly 10 which is turnable about pivots 12 to permit shafts to be drilled at different angles. In the interests of clarity, the drive assembly, thrust assembly and pipe loader assembly are omitted.

Figure 5:
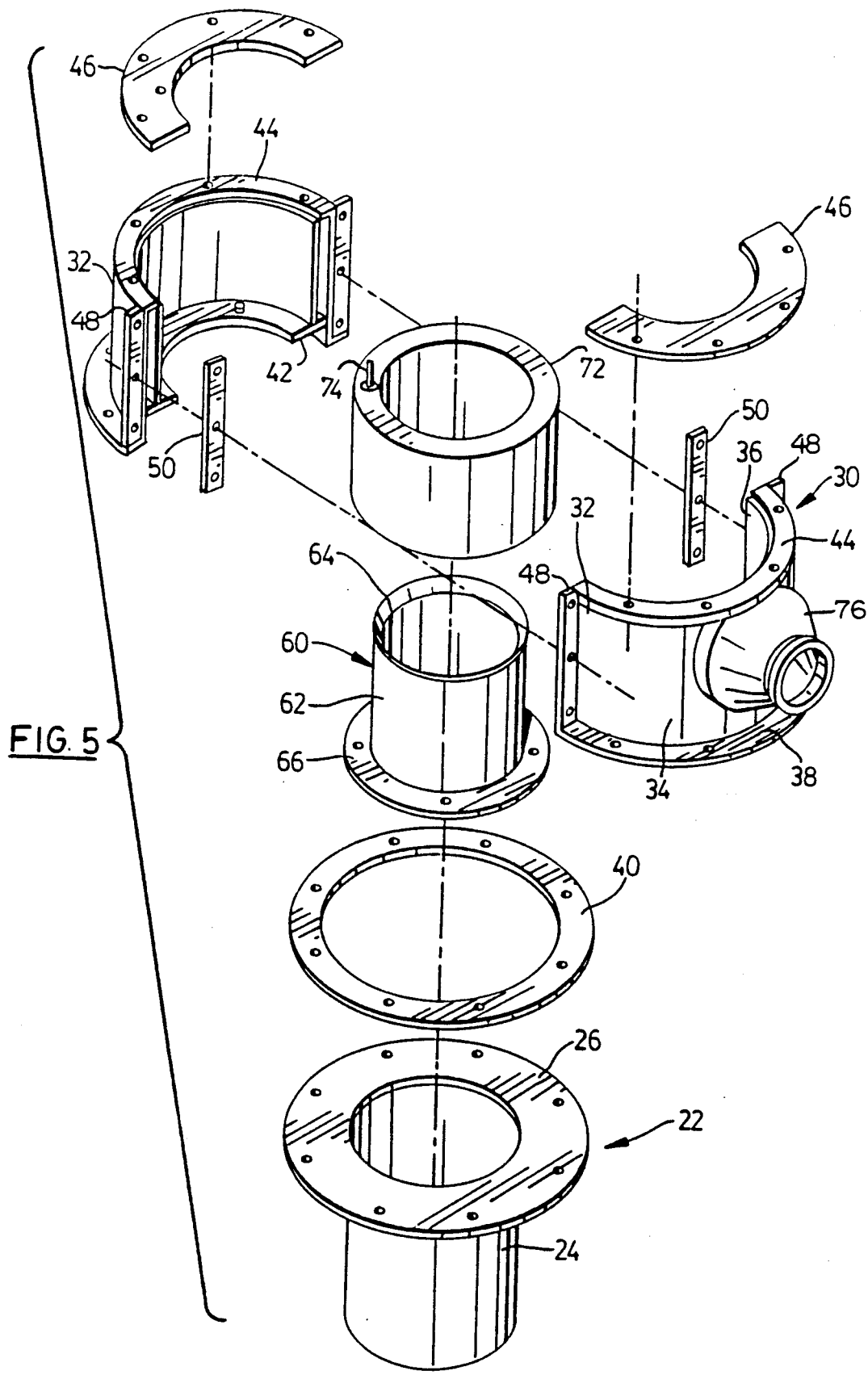
FIG. 5 is an exploded view showing the assembly of FIGS. 3 and 4.

A drill rod section is shown at 14 and the seal assembly for co-operation with the drill rod is illustrated at 20. That seal is more fully illustrated in FIGS. 3, 4 and 5 and its component parts are more clearly shown in FIG. 5. They comprise a lower housing indicated generally at 22 and comprising an open ended cylindrical body 24 with an annular, radiallly disposed flange 26 at its upper end. An upper housing 30 comprises a pair of semi-cylindrical shells 32, each of which has an outer cylindrical wall 34 and a spaced, inner cylindrical wall 36. The outer walls have semi-annular flanges 38 at their lower edges and the flanges 38 and flange 26 of the lower housing are pre-drilled so that they may be bolted together. A gasket 40 is provided to seal the interface between the flanges.

The inner wall 36 terminates short of the lower edge of the outer wall 34 and an annular flange bridges the space between the two walls and projects radially inwardly of the inner wall as at 42.

The gap between the inner and outer walls at the top of the shells is closed by semi circular plates 44 which are pre drilled to receive cover plate sections 46 which project inwardly of the inner wall 36 in the same manner as does plate 42.

The opposed edges of the shells have longitudinally extending and radially disposed flanges 48 which are joined together by bolting with sealing gaskets 50 between their opposed faces.

A seal 60 has a generally cylindrical body 62 with an upper flared lead-in surface 64 and an annular radial flange 66. The flange 66 is pre-drilled to match the holes in plate 42 and is secured to that plate by nuts, bolts and washers.

Thus, the outer surface of the cylindrical part of the body 62 and the inner surface of the inner wall of the upper housing form an annular space. A bladder 72 having an inflation valve 74 is disposed in this space.

The seal is of resilient rubber material and it will be apparent from a consideration of FIG. 3 that the inflation of the bladder will cause the seal to be pressed firmly against the outer surface of the drill rod.

Secured to one half shell of the upper housing is an outlet or reducer 76 which communicates with the space between the outer wall of the housing and the drill rod and leads to a conduit so that slurry reaching the seal will be diverted to a conduit for controlled disposal.

FIG. 6 illustrates the particular bladder utilized and it will be seen that it comprises simply a closed ended tube which is turned about the inner surface of the inner wall of the shells to form a torioidal shape.

Figure 2:
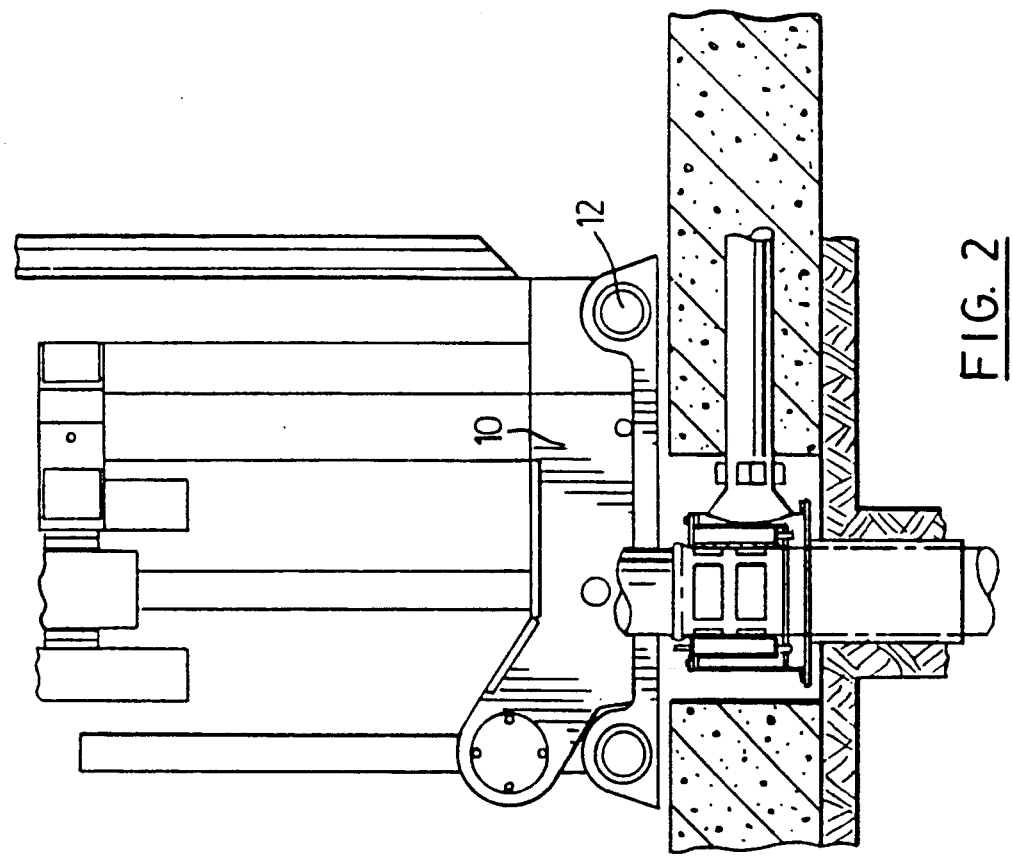
FIG. 2 is a side view of the assembly of FIG. 1.

Reference is now made to FIGS. 1 and 2. In installing the drill and seal, the main body is first secured in place by conventional rock bolts indicated at 80. Most usually, this is done on a concrete pad as at 82 and a well is left below the feet of the drill as at 84.

Firstly, a hole is drilled in the rock to a depth equal, approximately, to the length of the lower housing and of a diameter into which that housing may fit. The lower housing is then installed and sealed against the walls of the shaft either with burlap or with grouting.

The rubber seal is then applied to the drill rod and the drill but inserted into the drill hole. The two shells forming the upper housing are then bolted about the drill rod and secured to the upper flange of the lower housing. The rubber bladder is then inserted into the space between the seal and the inner surface of the inner wall of the upper housing and the cover plate, made up of plates 44, bolted in place at the top of the upper housing. Thereafter, the bladder is inflated to press the seal into tight contact with the drill rod. Of course, the outlet is secured to the conduit for the slurry.

The present invention provides a simple and convenient solution to a problem which has existed for many years in the mining and other arts involving rock drilling which is effective and which accommodates wear in the seal by expansion of the bladder or, if need be, re-inflation of the bladder.

We claim:

1. A fixed seal for cooperation with a drill rod of a rotary earth or rock drill, said seal comprising:
   a housing having an inner generally cylindrical surface;
   means for fixing said housing at a proximal end of a shaft;
   a flexible generally cylindrical seal having an outer cylindrical surface and a radially inner face sealingly engageable with a drill rod, said inner cylindrical surface of said housing and said outer cylindrical surface of said seal defining a toroidal space;
   an inflatable bladder disposed in said toroidal space, said bladder by reaction with said cylindrical surface of said housing pressing said seal into sealing engagement with a drill rod;
   an outlet provided in said housing communicating with a space beyond the distal end of said seal and in close proximity with said seal;
   means for connecting said outlet to an outlet conduit; and
   means for fixing said seal and said housing to prevent rotation of said seal as the drill rod rotates.

2. A seal as claimed in claim 1, wherein said housing comprises a pair of separable semi-cylindrical sections.

3. A seal as claimed in claim 2, wherein said housing comprises a pair of semi-circular flanges separably secured to said semi-cylindrical sections and extending towards said drill rod.

* * * * *